United States Patent Office 3,428,251
Patented Feb. 18, 1969

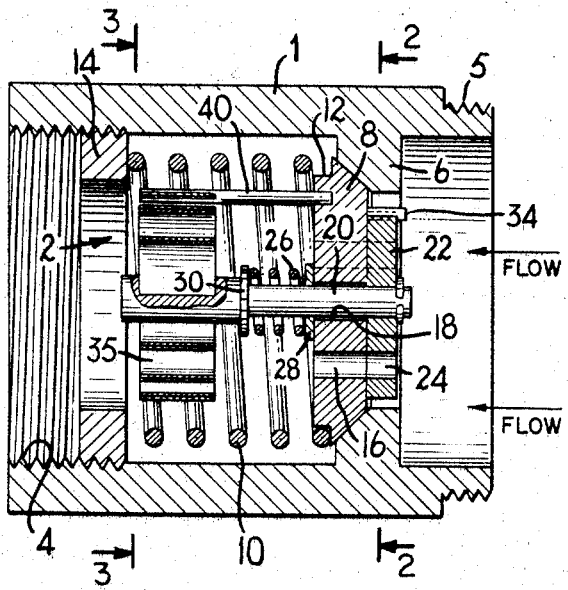

3,428,251
TEMPERATURE AND PRESSURE RESPONSIVE VALVE
Robert I. Gross, Roslyn Heights, and Roydon C. Cooper, Locust Valley, N.Y., assignors to Pall Corporation, Glen Cove, N.Y., a corporation of New York
Filed Feb. 7, 1967, Ser. No. 614,512
U.S. Cl. 236—92                                13 Claims
Int. Cl. G05d 16/14; F16k 15/00

ABSTRACT OF THE DISCLOSURE

A pressure and temperature responsive valve is provided. The valve comprises a ported poppet that is normally biased against a valve seat and is movable away from the valve seat when a predetermined pressure differential across the valve occurs. A rotatable disk is mounted in a confronting relationship to the poppet. The disk is also ported and is adapted to close off the ports of the poppet at selected rotational positions relative to the poppet. At other relative rotational positions, however, the ports in the disk register with the ports in the poppet and permit flow to pass through the valve. A bimetallic coil is operatively connected to the disk and adapted to rotate the disk relative to the poppet according to the temperature such that at selected temperatures the ports in the poppet register with the ports in the disk and permit flow to proceed through the valve and at other temperatures the disk closes off the ports in the poppet. The rotation of the disk relative to the ported poppet is independent of the pressure differential across the valve and thus, whenever a predetermined temperature is reached, the ports in the poppet are opened to permit flow therethrough independently of the pressure differential across the valve.

This invention relates to a combined pressure and temperature responsive valve and more particularly it relates to a combined pressure and temperature responsive valve having improved temperature response and a reduced pressure drop across the valve.

The temperature of a fluid flowing in certain systems often can be quite important to the operation of that system. For example, if the fluid is too cold, it can become quite viscous and clog small orifices in the system. It can also cause an excessive pressure differential across the system resulting in damage to the components thereof. Moreover, if the fluid is used as a coolant or as heat source, if the temperature of the fluid is not at the desired level, the fluid will not perform its function. Thus, it is often desirable to provide a valve which will regulate or prevent flow through a system when the fluid is either below or above a desired temperature.

Many of these same fluid systems also include a pressure relief valve, and it has been found extremely desirable to incorporate both these valves into a single unit which provides response to changes in both temperature and pressure.

The valves of this type which were provided by the prior art often had many parts, were quite complicated, and offered a good deal of resistance to flow through and by the valve. Such resistance to flow undesirably increases the pressure drop across the valve. Moreover, the temperature response of the valves provided by the prior art was often sluggish and inefficient. These valves often used as the means for providing temperature response, thermally responsive bellows or chambers filled with thermally sensitive materials such as wax. The thermal response of these valves normally was accomplished by the longitudinal movement of a shaft actuated by the thermally caused expansion of the bellows, wax, etc. A typical example of a valve taught by the prior art is shown in U.S. Patent No. 2,047,722 to Work. This valve employs a temperature sensitive bellows which when heated overcomes the resistance of a spring 44 and forces the valve mechanism axially away from its seat. Another typical device is described in U.S. Patent No. 2,636,776 to Vernet.

The instant device provides a simple structure which incorporates an axial pressure response with a rotary thermal response in a combined pressure and temperature sensitive valve. Improved flow characteristics through the valve are obtained due to the configuration and small number of parts in the valve, and rapid response of the valve to thermal changes is also obtained by the instant invention.

The instant valve comprises, in combination, a valve movable between open and closed positions and having at least one port therethrough; bias means disposed to normally hold the valve in a closed position until a predetermined pressure differential across the valve is exceeded; a rotor rotatably mounted in a confronting relation to the ported valve, the rotor having a surface adapted to close off the port of the valve at a selected rotational position thereof, and permit flow through the port of the valve at at least one and if desired at a plurality of other selected rotational positions; and bimetallic thermally responsive means operatively connected to the rotor and adapted to rotate the rotor relative to the valve to such selected rotational positions at selected temperatures, whereby whenever a predetermined pressure differential across the valve is exceeded, the valve opens and permits flow, and according to the temperature, the rotor is brought to a selected rotational position relative to the valve and controls flow therethrough.

The combined pressure and temperature responsive valve of the instant invention can be placed in a housing which is easily adaptable to be inserted in a fluid line. Such a housing can be provided with suitable pipe connections. However, the valve could also be housed in a permanent portion of a fluid line of a given system.

A valve seat will usually be formed as part of the housing. However, a seat could also be provided as a separate fitting which is fixed in place in the fluid line.

The valve is preferably a poppet valve, which is biased against the valve seat by a spring. However, other valves such as a flat plate valve or diaphragm valve can also be used.

The bias means can be any type of spring such as a helical compression spring, an extension spring, a Belleville spring washer, a plate spring and the like. A helical compression spring is preferred. The tension of the spring will be selected to permit the valve to move away from its seat and to permit fluid to pass between the valve and the valve seat whenever a predetermined pressure drop across the valve is exceeded.

The valve will be formed with one or more ports therethrough and these can be formed in any desired configuration, size and number. This will be largely determined by the area available on the face of the valve for the ports, and by the maximum permissible pressure drop across the valve. The ports can be shaped to permit a variable rate of flow therethrough depending upon the rotational position of the rotor.

The valve will normally be formed with a flat surface against which the rotor will be placed. A stop member can be provided on the face of the valve to engage the rotor and permit rotation of the rotor only within a selected range.

The rotor is preferably a disk having a flat surface which is disposed in a confronting relationship to the valve. The surface of the disk need not be flat, however. The disk could have concave or convex surfaces as long as it is adapted to mate with and form a relatively fluid tight seal against the surface of the valve. The disk need not be circular, it can also have a cam or star-like configuration.

If a generally circular disk is used, it will be formed with one or more ports or apertures therethrough which correspond to those of the valve. These ports need not be circular, but could comprise radial slots in the disk. In addition, the ports can be dimensioned to progressively vary the rate of flow through the valve for a range of temperatures. When these ports are placed in a registering position with those of the valve, fluid will be permitted to flow through the valve. The spaces between the ports of the disk comprise the sealing surfaces of the rotor which prevent flow through the valve when the ports of the disk and the ports of the valve are not in a registering position.

If a cam or star-like disk configuration of the rotor is used, one or more of the extending cams or star-like protrusions will provide the sealing surfaces for the valve. They will correspond in number to the ports of the valve and will be dimensioned to cover these ports and seal off flow therethrough at selected rotational positions of the rotor. The extending cams or star-like protrusions can be shaped, in combination with the ports of the valve, to progressively vary the rate of flow through the valve assembly for a range of temperatures. It is also possible to provide means to impart a snap-like movement between positions of the rotor.

The rotor can be mounted in the assembly on a central shaft. It can be mounted onto the shaft by shrink-fitting, press-fitting, swaging, welding, brazing and the like. In certain embodiments of the invention however the rotor will be mounted on the shaft with a slip-fit. In the preferred embodiment, the rotor is press-fit onto the main shaft. This shaft is disposed through a central aperture in the valve. The shaft will not be fixed to the valve but will be in a slip-fit relationship therewith and thus will permit relative rotation of the rotor and the valve.

In addition, the shaft, or at least the distance along the shaft between the valve and the bimetallic means, should be relatively short. It has been found in the instant invention that forces are developed which have a tendency to cock, or displace the main shaft from the perpendicular to the valve. This tendency can be substantially overcome by disposing the bimetallic means and the valve relatively close together in the assembly.

The rotor can be held tightly against the face of the valve to prevent leakage therebetween by providing a spring and a plate to bias the rotor tightly against the face of the valve.

The means for providing a thermal response of the valve is preferably a bimetallic coil. A bimetallic coil is preferred since it yields a particularly rapid response as compared to a bellows or a thermally responsive material, such as a wax or the like.

Bimetallic coils are also preferred since when they are aligned along the axis of the valve assembly they provide very little resistance to flow passing therethrough. This is due to the fact that if the coil is disposed in the instant invention with its surfaces tangential to the direction of flow, there will be very little surface area to obstruct the flow. Thus, no excessive pressure drop across the valve is caused by this structure. The bimetallic coil however provides a rapid response since it does have a good deal of surface area that is exposed to the fluid.

Such coils are normally made from materials such as copper and steel, which have different expansion rates. These metals are brazed or welded together to form a strip with one side of copper, the other side of steel. This strip is then formed into a coil. Since one side of the coil expands at a different rate than the other, when subject to a change in temperature, the coil will tighten or loosen (depending on the change in temperature), due to the torsion created by the expansion of the metals. In the instant device, this tightening and loosening of the coil causes rotary movement of the rotor as will be further described below.

Other bimetallic responsive means, such as bimetallic strips, can also be used to provide rotary movement of the rotor. However, as indicated the bimetallic coil is preferred.

The bimetallic coil can be fixed axially to the central shaft at the center of the coil. The outer end of the coil can be provided with an arm which extends axially to the valve and is fixed thereto. Thus, since the central shaft is fixed to the rotor and since the bimetallic coil is fixed to the shaft and to the valve, when the bimetallic coil tightens or loosens, in response to a change in temperature, the turning effect caused thereby will rotate the rotor relative to the valve. Thus, the thermal response of the valve is achieved.

It is to be noted that the valve can be designed such that the rotor and the valve are disposed relative to each other such that normally flow can proceed through the valve. However, the valve can be designed such that normally the rotor seals off the ports of the valve and prevents flow through the valve.

In one embodiment of this invention, the bimetallic coil is disposed downstream of the valve and the valve seat. However, if desired, the bimetallic coil can be provided on the upstream side of the valve and this will be desirable for use in a valve which is designed to normally close off flow. This is due to the fact that in a normally closed system, communication of a change in temperature to the bimetallic coil is more readily achieved when the coil is upstream of the valve, since warm or cool fluid which causes the response of the valve can easily reach the exposed coil. Thus, by placing the coil upstream of a valve, rapid response of the system is assured.

Rotational movement of the rotor provides a response which is rapid and one which does not require a great deal of force to open the valve in response to a temperature change. This is due to the fact that no axial movement of the valve is needed to open it for thermal response. The springs, which are used to prevent leakage between the rotor and the valve normally act in an axial direction, and thus no direct spring force need be overcome to turn the rotor. Only frictional forces need be overcome by the bimetallic coil to either open or close the valve.

Since portions of the instant valve assembly rotate against frictional resistance, it is desirable to reduce the coefficient of friction between these portions to a minimum. Suitable coefficients of friction between the rotating portions of the valve can be up to about 0.05 and are preferably less than 0.01. Low coefficients of friction can be provided by using metals having a low coefficient of friction between them. Moreover, the portions of the assembly which bear against each other and undergo relative rotational movement, should be precisely machined to minimize frictional resistance to such movement and also reduce wear. For example, the rotor and the valve can be made of stainless steel, and their surfaces should be precisely machined. In addition, any washers or springs which bear against either of these elements and which are disposed to rotate thereagainst, should also be machined to provide a minimum of friction.

It is also possible to treat the surfaces of these rotating parts to minimize the coefficient of friction between them. For example, the rotating parts can be chrome-plated or plated with a composition of molybdenum disulfide or the like.

The operation of a normally open valve is as follows: Under normal conditions, the rotor will be disposed to expose the ports in the valve. Fluid is then free to flow past the rotor and through the valve to the bimetallic coil. If, however, the temperature of the fluid passing through the assembly goes below or above a selected temperature, the bimetallic coil, due to the different expansion rates of the two metals which comprise the coil, will tighten (or loosen) causing a rotary movement to be imparted to the end of the coil. This causes relative rotation of the rotor and the valve to seal off the ports of the valve and prevent flow therethrough.

If the pressure of the fluid in the line should increase beyond a selected amount, the force of the fluid acting upon the face of the valve will overcome the resistance of the spring and permit the valve to move away from its seat. This permits fluid to flow between the valve and its seat and through the assembly.

The instant invention will be more particularly described in connection with the accompanying drawings in which:

FIGURE 1 is a view in cross-section of one embodiment of the instant invention.

FIGURE 2 is a view taken along line 2—2 of FIGURE 1 and in the direction indicated by the arrows.

FIGURE 3 is a view in section taken along line 3—3 of FIGURE 1 and in the direction indicated by the arrows.

FIGURE 4 is a view in cross-section of the alternative embodiment of the instant invention.

FIGURE 5 is a view similar to that of FIGURE 2, showing another embodiment of the rotor, and FIGURE 6 is a view in cross-section taken along the line 6—6 of FIGURE 4 and in the direction of the arrows.

In FIGURE 1, a generally tubular housing 1, which is formed with pipe connections 4 and 5, and which encloses the valve assembly 2 is shown. A valve seat 6 is formed within the housing, and a poppet valve 8 seats thereagainst. This poppet valve 8 is biased against the seat 6 by a helical compression spring 10 which seats in a notch 12 in the poppet valve 8 and bears against a threaded collar 14 in the housing. The poppet valve 8 is provided with a plurality of ports 16 therethrough and a central aperture 18 through which a relatively short main shaft 20 is disposed in a slip-fit. In this embodiment, the rotor comprises a flat disk 22 which is disposed immediately adjacent to the poppet valve 8 and upstream thereof.

The disk 22 and poppet valve 8 are both provided with precisely machined flat surfaces which rest against each other. The disk is press-fitted onto the main shaft 20 and rotates therewith. A plurality of ports 24 are provided in the disk 22 and these are disposed to register with the ports 16 of the poppet valve 8.

The disk 22 is held in a relatively fluid-tight seal against the face of the poppet valve 8 by a spring 26. This spring is disposed on the downstream side of the poppet and bears against a washer 28 which is disposed immediately adjacent to the downstream side of the poppet valve 8. The spring also bears against a flange 30 on the main shaft 20 and exerts an axial force thereagainst to thereby assist in keeping the shaft normal to the poppet. If desired, and if the coefficient of friction between the spring 26 and the poppet valve 8 are properly selected, the washer 28 can be eliminated.

The disk 22 is also provided with a notched or recessed portion 32 and a stop 34 extends from the poppet valve and slides within the recess 32 when the disk is rotated relative to the valve. This stop and notch arrangement limits the rotation of the disk relative to the poppet valve 8. This can best be seen by reference to FIGURE 2.

A bimetallic coil 35 is fixed to the main shaft 20 and is disposed on the downstream side of the poppet valve 8. The central portion 37 of the coil 35 is tightly fitted in an axial groove 39 in the main shaft 20 and this arrangement prevents relative movement between the bimetallic coil and the shaft. This can best be seen by reference to FIGURE 3. The outermost portion of the coil is provided with an arm 40. This arm 40 extends axially from the coil to the poppet 8 and it is fixed thereto.

In this embodiment of the instant invention, the valve is designed to be in a normally open position. Thus, the ports of the disk and poppet are normally in registering positions. The valve is also designed such that when the temperature of the fluid flowing through the ports goes above a predetermined value, the bimetallic coil due to the different expansion rates of the two metals from which it is composed loosens and thus causes rotary motion of the arm 40. This in turn causes relative rotation of the disk 22 and the valve 8 and results in the ports of the valve being sealed off by the disk. To accomplish this, the bimetallic coil is wound in the direction shown in FIGURE 3 and with the metal having the greater expansion coefficient on the inside.

If an opposite response of the valve is desired, i.e., when the temperature of the fluid goes below a predetermined value, the valve closes, it would merely be necessary to either reverse the direction in which the bimetallic coil is wound or to wind it with the metal having the greater coefficient of expansion on the outside.

The pressure response of the valve is provided by the axial movement of the poppet valve 8 away from the seat 6. When the pressure drop in the fluid across the valve exceeds a predetermined value, the resistance of the spring 10 will be overcome, causing the poppet to move axially away from its seat, and the fluid will then be free to pass between the valve 8 and the seat 6.

In the embodiment of the invention, shown in FIGURE 4, the bimetallic coil is placed upstream of the poppet valve. The poppet valve 50 is biased against the valve seat 52 in the housing 60 by a Belleville spring washer 58. The Belleville spring washer 58 bears against a flange 62 on the housing 60 and seat in a notch 63 in the poppet valve 50. The poppet valve 50, as in the previous embodiment, is provided with a plurality of ports 56 therethrough and a central aperture 65 through which the main shaft 70 is disposed. The main shaft 70 in this embodiment is press-fitted into the valve 50 and is fixed for rotation therewith. Upstream of the poppet valve 50 is a disk 72. The disk 72 in this embodiment is fitted in a slipfit on the main shaft 70 which extends through its center. This disk is provided with a plurality of ports 74 which are in the form of radial slots and disposed to correspond to and register with the ports in the poppet valve.

A helical compression spring 75 bears against a plate 76 which is disposed adjacent to and immediately upstream of the disk 72 and against a flange 78 on the main shaft 70. This spring maintains the disk in close contact with the poppet valve 50 and insures that there will be relatively no leakage between the two. A bimetallic coil is fixed at its center to the main shaft on the upstream side of the disk. The other end of the bimetallic coil is fitted with an arm 82 which extends axially therefrom to the disk 72. This arm is fixed to the disk for rotation thereof. This embodiment is adapted for use in a system in which the valve is to be normally closed.

In operation, the ports 74 of the disk 72 will not be in a registering position with the ports 56 of the poppet valve and no fluid will pass through the assembly. Should the temperature of the fluid exceed or drop below a selected temperature, the bimetallic coil due to the different expansion rates of the two metals of which it is composed, causes rotary movement of the arm 82 and the disk 72. This permits the ports 74 of the disk to register with the ports 56 of the poppet valve 50, and permits flow through the valve assembly.

If the pressure drop in the fluid across the valve line exceeds a predetermined value, the force of the fluid acting on the face of the poppet valve 50 will overcome the force of the Belleville spring 58 and the poppet valve 50 will move away from its seat to permit fluid to pass between the poppet valve 50 and the seat 52.

In FIGURE 5, another embodiment of the rotor is shown. The rotor in this instance is a cam wheel 84 mounted on a central shaft 88. The cams 90 comprise the closure surfaces for the ports 86 of the poppet valve 85.

The cams 90 can be shaped to progressively vary the flow through the ports 86.

In FIGURE 6, the embodiment of the rotor used in FIGURE 4 is shown. The rotor used in this case is a ported disk 72 mounted on the shaft 70. The ports 74 of the disk are in the form of radial slots. The spaces between the slots form the closure surfaces for the ports 56 of the poppet valve 50. A slot 92 in the disk 72 and a pin 94 in the poppet valve 50 are provided to limit rotation of the disk.

The instant valve assembly has few parts and provides a compact novel structure having low resistance to flow and a consequent low pressure drop thereacross due to the use of the bimetallic coil. Rapid response is enhanced by the rotary movement of the rotor. The thermal forces which cause movement need not overcome any direct axial spring force to rotate the rotor, but need only overcome the frictional forces acting between the surfaces of the poppet valve and the rotor.

Having regard to the foregoing disclosure the following is claimed as the inventive and patentable embodiments thereof:

1. A temperature and pressure responsive valve comprising, in combination, a valve movable between open and closed positions and having at least one port therethrough; bias means disposed to normally hold the valve in a closed position until a predetermined pressure differential across the valve is exceeded; a rotor rotatably mounted in a confronting relation to the ported valve, said rotor having a surface adapted to close off the port of the valve at a first selected relative rotational position thereof and permit flow through the port of the valve at a second selected rotational position thereof; and bimetallic thermally responsive means operatively connected to the rotor and adapted to rotate the rotor relative to the valve between said first and second selected rotational positions to close off or allow flow through the valve according to the temperature independently of the pressure differential across the valve whereby, whenever a predetermined pressure differential across the valve is exceeded, the valve opens and permits flow, and the rotor is brought to one of the selected rotational positions relative to the valve and controls flow therethrough according to the temperature independently of the pressure differential across the valve.

2. A temperature and pressure responsive valve in accordance with claim 1, in which the bimetallic thermally responsive means is a bimetallic coil.

3. A temperature and pressure responsive valve in accordance with claim 1, in which the rotor is a ported disk.

4. A temperature and pressure responsive valve in accordance with claim 3, in which the ports are in the form of slots.

5. A temperature and pressure responsive valve in accordance with claim 1, in which the valve is a poppet valve.

6. A temperature and pressure responsive valve in accordance with claim 1, in which the rotor is a cam wheel.

7. A temperature and pressure responsive valve in accordance with claim 1, in which the bimetallic thermally responsive means is disposed downstream of the valve.

8. A temperature and pressure responsive valve in accordance with claim 1, in which the bimetallic thermally responsive means is disposed upstream of the valve.

9. A temperature and pressure responsive valve comprising, in combination, a poppet valve movable axially between open and closed positions, the poppet valve having a plurality of ports therethrough; a spring disposed to normally hold the poppet valve in a closed position; a disk having a plurality of ports therethrough disposed adjacent to the poppet and mounted for rotation relative to the poppet, the ports of the disk being disposed to register with the ports of the poppet at a selected rotational position thereof, and the disk being adapted to close off the ports of the poppet at at least one other selected rotational position of the disk; an axially disposed bimetallic coil operatively connected to the poppet valve and to the disk to cause relative rotation of the disk and the poppet valve whenever the bimetallic coil tightens or loosens in response to a change in temperature, whereby whenever a predetermined pressure differential across the poppet valve is exceeded, the poppet valve opens and whenever a predetermined temperature is reached, the disk is rotated relative to the poppet valve to a selected rotational position to control flow through the assembly.

10. A temperature and pressure responsive valve in accordance with claim 9 including a second spring disposed to bias the disk against the poppet valve.

11. A temperature and pressure responsive valve in accordance with claim 9 including a shaft disposed centrally in a slip-fit through the poppet valve and fixed to the center of the disk and fixed to the center of the bimetallic coil on the downstream side of the poppet.

12. A temperature and pressure responsive valve in accordance with claim 9, in which the bimetallic coil is disposed on the upstream side of the poppet and including a shaft which is fixed to the center of the poppet valve and extends in a slip-fit through the disk and is fixed to the center of the bimetallic coil.

13. A temperature and pressure responsive valve in accordance with claim 9 including a shaft and a means to prevent cocking of the shaft.

References Cited

UNITED STATES PATENTS

| | | | |
|---|---|---|---|
| 2,183,650 | 12/1939 | Klafstad et al. | 137—468 |
| 2,415,475 | 2/1947 | Eshbaugh. | |
| 2,610,831 | 9/1952 | Jensen. | |
| 2,614,575 | 10/1952 | Jensen | 137—468 X |

ROBERT A. O'LEARY, *Primary Examiner.*

W. E. WAYNER, *Assistant Examiner.*

U.S. Cl. X.R.

137—468